E. A. GRAHAM.
TELEPHONE SYSTEM.
APPLICATION FILED MAR. 31, 1914.
1,179,175.
Patented Apr. 11, 1916.
3 SHEETS—SHEET 1.
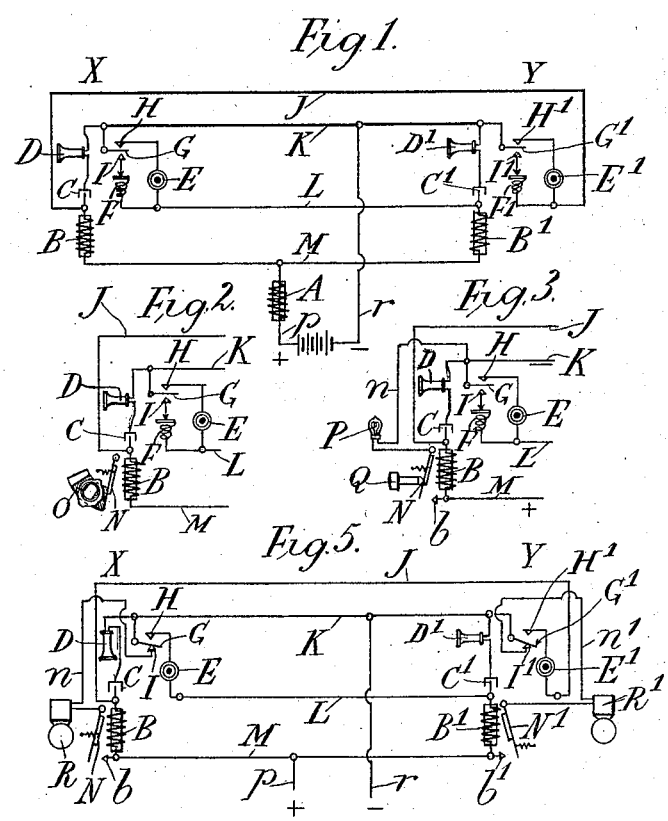

E. A. GRAHAM.
TELEPHONE SYSTEM.
APPLICATION FILED MAR. 31, 1914.
1,179,175.
Patented Apr. 11, 1916.
3 SHEETS—SHEET 2.
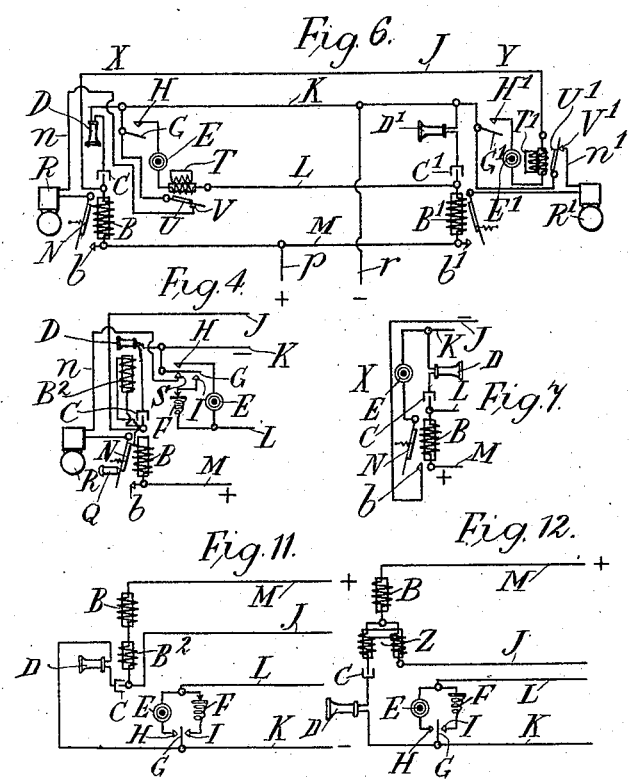

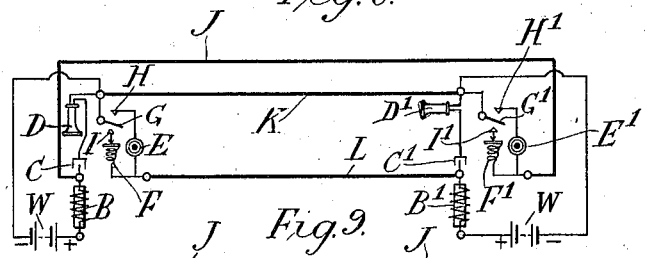
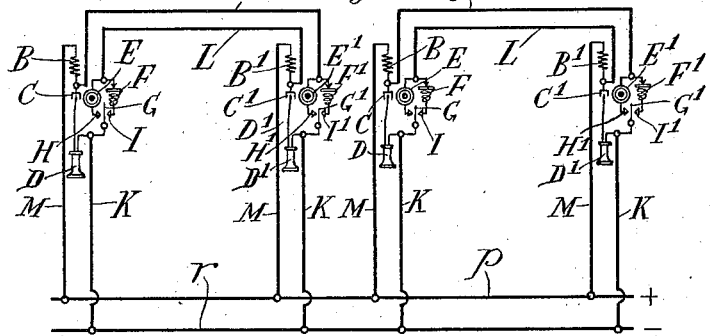
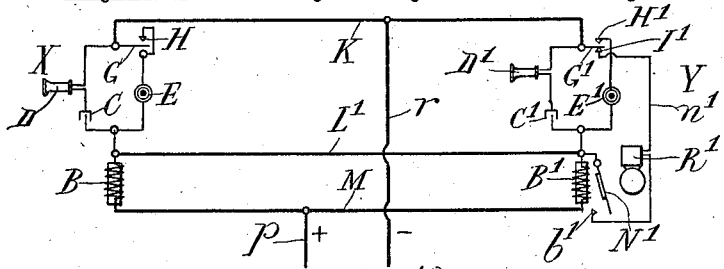

UNITED STATES PATENT OFFICE.

EDWARD ALFRED GRAHAM, OF BROCKLEY, LONDON, ENGLAND.

TELEPHONE SYSTEM.

1,179,175.  Specification of Letters Patent.  Patented Apr. 11, 1916.

Application filed March 31, 1914. Serial No. 828,552.

*To all whom it may concern:*

Be it known that I, EDWARD ALFRED GRAHAM, a subject of the King of Great Britain and Ireland, residing at Brockley, in the county of London, England, have invented Improvements in Telephone Systems, of which the following is a specification.

This invention relates to telephonic circuits particularly applicable to loud speaking telephones and it includes arrangements wherein the mode of operation is that well known as the common battery or central energy system in which the electrical supply circuit includes relatively high impedances and is in parallel with transmitter and receiver circuits, the increase or decrease of current, consequent upon the variation in the resistance of the transmitter of one circuit causing a corresponding decrease or increase in the current through another circuit containing a receiver owing to the effect of the inductance in their common supply. Such circuits have been well known to those versed in the art of telephony, and early systems of this kind are disclosed in Stone's United States specifications Nos. 507694, and 508255, Hayes' United States specification 474323 and McBerty's United States specification 584393 and many others.

In the specifications particularly referred to, two conductors between stations are provided and the transmitters and receivers are connected in series or in parallel across the two lines. Circuits employing three conductors with two corresponding parallel circuits each including only one transmitter and a receiver or receivers, these circuits being completed by a common return, are a simple modification of the foregoing arrangement and reference may be made to Mix and Genest's German Patents Nos. 152372 of 1904 and 159780 of 1905, wherein the transmitter of one instrument is in parallel with the receiver of another instrument and vice versa and the two circuits thus arranged are bridged by the electrical supply apparatus which includes inductance coils. No claim therefore is made in the present specification for the method of connecting telephonic elements as hereinbefore mentioned.

The principal feature of the present invention lies in the arrangement of the inductance coils which, in this case, form a part of the telephone instruments proper and which are so arranged that the current for supplying the transmitter at the calling station flows through the winding of the inductance coil located at the called station, the receiver thereat being also connected to the inductance coil through a condenser in parallel with the transmitter at the calling station. The interposition of the condensers is of advantage as only speech currents traverse the telephonic windings of the receivers and these receivers are always available for voice calls without passing a continuous flow of current through their windings. Further, by this arrangement each inductance which may take the form of a suitable retardation or other coil, may be utilized to perform functions other than those purely telephonic, for instance it may serve as the energizing coil of a relay acting for various purposes, or as a magnetizing or polarizing coil of the receiver.

Figures 1 to 12 of the accompanying drawings are diagrams each illustrative of a station arrangement in accordance with the invention.

In Fig. 1, A is an inductance coil placed in the positive supply line $p$ which, although advantageous in some circumstances, as for example when machine generated current is used, is not essential to the operation of the system. B and $B^1$ are inductance coils, situated in the telephone apparatus and acting for other purposes as hereafter mentioned, C and $C^1$ are condensers or the like, D and $D^1$ are the telephonic receivers, E and $E^1$ are transmitters and F and $F^1$ are interrupters or vibrators of the kind which, when functioning, cause a "hooting" noise to be emitted from the receiver of the distant station, for calling attention. G and $G^1$ are switch arms adapted respectively to be placed in connection with contacts H and I and $H^1$ and $I^1$. J, K, L, and M indicate line wires connecting the two instruments. When communication is required, say from station X to station Y, the switch arm G is caused to press against contact I. Current will then flow from the positive supply lead $p$ through the windings of the inductance coil $B^1$ at station Y along the line L, through the interrupter F and contacts I, G at station X and along the line K to the negative supply lead $r$. The receiver $D^1$ at station Y with the condenser $C^1$ is in shunt to the said circuit containing the interrupter, and current fluctuations, alternating in character, consequent upon the operation of the interrupter, will flow through the receiver winding $D^1$ and cause the receiver to emit a loud hoot or call. For a voice call, the switch arm G is caused to engage contact H whereby current is caused to flow from the positive supply lead $p$ through the inductance coil $B^1$ at station Y, along line L, through transmitter E and contacts G H and along conductor K to the negative supply lead $r$. Upon the transmitter E functioning, a varying current will pass through the condenser $C^1$ and the windings of the receiver $D^1$ causing emission of speech therefrom. The same series of operations applies for calling from station Y to station X and, of course, in this case the feeding current for the interrupter $F^1$ and transmitter $E^1$ flows through the windings of the inductance coil B at station X.

As the feeding currents for the calling device and transmitter at the calling station flow through the windings of the inductance coil located at the called station, it will be understood that by suitable construction the inductance coils may be adapted to perform various functions other than that particularly telephonic. Thus in Fig. 2, the inductance coil B is shown as provided with an armature N having a suitable flag O attached thereto so that upon current flowing, the coil and its core becoming magnetized, the armature N will be attracted and the flag moved into such position behind a window $O^1$ as to give a visual signal of the fact of a call being made to that particular telephone instrument, as is necessary when a number of telephones are mounted in close proximity.

Fig. 3 shows the arrangement of a telephone station in which the inductance coil B is provided with an armature N as in the previous case, but the actuation of the armature serves to close a local circuit $n$ at the contact $b$ after the manner of a relay and thereby causes a signal lamp P to glow, affording an indication of a call. Q is a plunger which may be actuated from without the telephone casing to close the local circuit through the signal lamp P by hand. This arrangement gives a ready indication as to the condition of the supply circuit which, if complete, and the signal lamp P without fault, will cause the latter to glow, thus obviating the necessity of opening up the instrument for testing, or of receiving a call from a distant position as would otherwise be required when testing the circuit. As current for operating the interrupter F or $F^1$ at one station flows through the inductance coil $B^1$ or B at the other station, it can be ascertained that the circuit is complete at the called station by causing the interrupter to function, the "buzz" being audible locally i. e., at the calling station. It is therefore possible to test the continuity of the supply leads at both ends from one station only.

In connection with telephone apparatus in which calls by interrupter or voice are provided for, it is occasionally necessary to employ loud ringing call bells and in Fig. 4 such an arrangement is indicated. Upon the circuit at the distant station being completed the inductance coil B becomes energized and the armature N is attracted, thereby completing a local circuit $n$, including the call bell R, from the positive lead $p$ to the negative lead $r$ through the contact $b$ and a contact S with which the switch arm G is normally in engagement. When the switch arm G is placed in connection with the contact H for the purpose of completing the transmitter circuit, the arm G leaves the contact S and opens the local circuit $n$ so that the call bell R will not ring during conversation. This figure illustrates also the application of the inductance coil for a purpose additional to that of a relay where a part $B^2$ of the windings of the inductance coil (the remainder being shown at B) is employed to form an energizing coil for the receiver D and used in lieu of a permanent magnet such as is usually embodied in receiver construction.

In a modified arrangement the interrupter F or $F^1$ at each station may be omitted and in this case it is only necessary to complete the transmitter circuit, as for speaking, to cause the call bell to ring. Such an arrangement is shown in Fig. 5 where the local circuit $n$ is arranged to be closed by way of the contacts $b$ and I. If for example a call is being made from station X to station Y, then the switch arm G is caused to engage contact H whereupon current will flow from the positive lead through the inductance coil $B^1$ along line L through the transmitter E, contact H, arm G and along line K to the negative lead $r$. The armature $N^1$ of the coil $B^1$ at station Y is in consequence actuated and completes through the contacts $b^1$ and $I^1$ the local circuit $n^1$ including the signal bell $R^1$. Upon station Y replying, the local circuit $n^1$ is broken by the switch arm $G^1$ leaving the contact $I^1$ and the speaking circuit is then completed through contact $H^1$.

As an alternative to breaking the local bell circuits $n$, $n^1$ by movement of the switch arm G or $G^1$ as described, non-inductive relays T, $T^1$ may be introduced into the transmitter circuits as shown in Fig. 6 and the bell circuits broken thereby. In this case—supposing station X to be calling station Y—upon the switch arm G being engaged with contact H, current flows from the positive supply lead $p$ through coil $B^1$, along line L, through the winding of relay T, transmitter E and along line K to the negative supply lead $r$. The armature N at station Y being thus attracted the local circuit $n^1$ including the call bell $R^1$ is completed through the contacts $b^1$ and $V^1$ and the armature $U^1$ of the local non-inductive relay $T^1$ that is arranged to be placed in the corresponding transmitter circuit at station Y. When the transmitter circuit at station Y is completed ready for reply the current flowing through the winding of the non-inductive relay $T^1$ will cause attraction of the armature $U^1$ which will leave the contact $V^1$ and so break the local bell circuit $n^1$ whereupon uninterrupted conversation can take place. Call bells are referred to as being included in the local circuit, but other alarm or signal devices of known kinds may of course be employed.

It is sometimes desirable that a called station shall be able to reply without the necessity of manually completing the local transmitter circuit at such called station. This may be effected according to the present invention by connecting, at say station X, the transmitter E to the armature N, as shown in Fig. 7. Upon completion of the transmitter circuit at the distant station Y for calling station X, current will flow through the windings of the inductance coil B at the latter station and the armature N will consequently be attracted and connect the line J, carrying feeding current, to the transmitter, by which means the reply circuit is completed and so remains until the transmitter circuit at the distant station is broken.

Other modifications of circuits such as described are shown in Figs. 8, 9 and 10. In Fig. 8 local sources of electrical energy, as for instance batteries W, are employed in which case it is only necessary to provide three conductors between the instruments. Otherwise the circuits are as described with reference to Fig. 1. In Fig. 9 the connections of the telephone stations are as shown in Fig. 1 the external wiring being modified only to the extent which will be readily understood without further description; the positive and negative supply lines $p$ and $r$ which may form a ring main, being common to any number of telephone instruments. In Fig. 10 the connections of the telephonic elements in the instruments are so modified as to require the employment of but one line wire $L^1$ in addition to the positive and negative supply leads K M. In this case when either of the transmitter circuits is completed, current flows through the inductance coils B, $B^1$ at both the calling and called stations. Thus when the switch arm G at station X bears on contact H current flows to the transmitter E by two paths, one direct through the inductance coil B and the other through the inductance coil $B^1$ and the line wire $L^1$. With the transmitter E in operation, alternating telephonic currents are caused to flow though the condenser $C^1$ and the windings of the receiver $D^1$ at station Y. At the latter station a steady current will pass through the inductance coil $B^1$ so long as the transmitter circuit is completed at station X, and the said inductance coil $B^1$ can therefore be employed for the purposes previously set forth. As an example, the circuit of a bell may be closed by the use of the inductance coil $B^1$ and broken during conversation, as before, by the movement of the transmitter switch $G^1$.

As an illustration of the application of the inductance coil for a purpose other than that of a relay and for a purely telephonic function, Fig. 11 may be referred to. The arrangement of the other elements of the circuit in this figure is as previously described but a part $B^2$, of the windings of the inductance coil (the remainder being shown at B) is, in the figure, employed to form an energizing coil for the receiver D as in Fig. 4 and used in lieu of a permanent magnet such as is usually embodied in receiver construction. The whole of the inductive windings may, if desired, take the form of energizing coils for the telephone receivers.

In Fig. 12, the telephone station connections are modified by the introduction of a repeater coil Z as frequently used in telephone systems, but otherwise the arrangement and operation is as hereinbefore described. It will be understood that when such a repeater coil is employed the inductance coil B, may be omitted as such repeater coil would be available for use as a relay or for the other purposes referred to in describing the inductance coil.

As will be obvious, the invention herein disclosed can be carried out in other ways than those specifically described, without departing from the essential features thereof which more particularly relate to the employment of telephonic inductance or like coils located at telephonic stations and so arranged that current flows through the windings of the said coil or coils located at the called station when the electric circuit is completed at the calling station, the said coils being therefore available for service other than the purely telephonic function of causing reproduction of speech and preventing cross speaking or overhearing.

Although pairs of telephones only are shown in communication in the drawings it will be obvious that the systems indicated may be applied to exchange working or to systems of communication between a control position and several sub-positions.

What I claim is:

1. A telephone system comprising at one station a series-connected receiver and condenser and at another station a transmitter and a current interrupter, leads and switching means adapted to connect the transmitter and interrupter alternatively to the said receiver, a source of current supplying such leads and a winding possessing inductance associated with the receiver for polarizing the same, such winding carrying the supply current for the transmitter.

2. A telephone system comprising at one station a series-connected receiver and condenser and at another station a transmitter and a current interrupter, leads and switching means adapted to connect the transmitter and interrupter alternatively to the said receiver, a source of current supplying such leads, a winding possessing inductance associated with the receiver for polarizing the same, such winding carrying the supply current for the transmitter and indicating means operated by the winding when the latter is excited.

3. A telephone system comprising at one station a series-connected receiver and condenser and at another station a transmitter and a current interrupter, leads and switching means adapted to connect the transmitter and interrupter alternatively to the said receiver, a source of current supplying such leads, a winding possessing inductance associated with the receiver for polarizing the same, such winding carrying the supply current for the transmitter, a switching member adapted to be operated by said winding when energized, a local circuit adapted to be closed by such switch member and an indicating device included in said circuit.

4. A telephone system comprising at one station a series-connected receiver and condenser and at another station a transmitter and a current interrupter, leads and switching means adapted to connect the transmitter and interrupter alternatively to the said receiver, a source of current supplying such leads, a winding possessing inductance associated with the receiver for polarizing the same, such winding carrying the supply current for the transmitter, a switching member adapted to be operated by said winding when energized, a local circuit adapted to be closed by such switch member, an indicating device included in said circuit and means for opening such local circuit during conversation.

5. In a telephone system, two instruments each comprising a series-connected receiver and condenser, a transmitter and a conversation switch, a source of current, leads connecting the instruments together and to such source of current, a winding possessing inductance associated with each receiver, the winding at one instrument carrying the supply current from the transmitter of the other instrument when the conversation switch at the latter is closed, a movable switch member associated with each inductance winding and a corresponding local circuit adapted to be closed when the conversation switch originating a call is closed for calling and to be opened upon closure of the said conversation switch for conversation.

6. In a telephone system, two instruments each comprising a series-connected receiver and condenser, a transmitter, a current interrupter and a switch adapted to alternatively connect the transmitter and interrupter in circuit, a source of current, leads connecting the instruments together and to such source of current, a winding possessing inductance associated with each receiver, the winding at the calling instrument carrying the supply current for the transmitter or interrupter of the other instrument depending upon the operation of the switch at the calling instrument, a movable switch member associated with each inductance winding and a corresponding local circuit adapted to be closed when the switch originating a call is closed and to be opened with closure of the switch to close the transmitter circuit.

7. In a telephone system, two instruments each comprising a series connected receiver winding, a condenser and an inductance winding, a transmitter and a switch device, a line wire connecting the receiver windings together, a line wire connecting one terminal of the transmitter of one instrument to a point between the inductance winding and condenser of the other instrument said switch device being adapted to connect the other terminal of the transmitter to the first mentioned line wire and a source of current having one pole connected to the inductance windings and the other pole to first mentioned line wire.

8. In a telephone system, two instruments each comprising a series-connected receiver winding, a condenser and an inductance winding, a transmitter and a switch device, a line wire connecting the receiver windings together, a line wire connecting one terminal of the transmitter of one instrument to a point between the inductance winding and condenser of the other instrument said switch device being adapted to connect the other terminal of the transmitter to the first mentioned line wire, a source of current having one pole connected to the inductance windings and the other pole to first mentioned line wire, a local circuit including a signaling device at each instrument adapted normally to be connected to one pole of the source of current and a switch member adapted to be operated by the corresponding inductance winding when energized and to connect the other end of said local circuit to the other pole of the source of current.

9. In a telephonic system, two instruments each comprising a series-connected receiver winding, a condenser and an inductance winding, a transmitter, a current interrupter and a switch device, a line wire connecting the receiver windings together, a line wire connecting one terminal of the transmitter and one terminal of the current interrupter in one instrument to a point between the inductance winding and condenser in the other instrument, said switch device being adapted to connect the other terminals of said transmitter and current interrupter alternatively to the first mentioned line wire and a source of current having one pole connected to one end of the inductance windings and its other pole connected to the opposite end of the receiver windings.

10. In a telephonic system, two instruments each comprising a series connected receiver winding, a condenser and an inductance winding, a transmitter and a switch device, a line wire connecting the receiver windings together, a line wire connecting one terminal of the transmitter and one terminal of the current interrupter in one instrument to a point between the inductance winding and condenser in the other instrument, said switch device being adapted to connect the other terminals of said transmitter and current interrupter alternatively to the first mentioned line wire, a source of current having one pole connected to one end of the inductance windings and its other pole connected to the opposite end of the receiver windings, a local circuit including a signaling device one terminal of which is arranged normally to be connected to one pole of said source of current by said switch device and a second switch device adapted to connect the other terminal of said local circuit to the other pole of said source of current each inductance winding having one part thereof arranged to polarize the corresponding receiver and another part to automatically close the second switch device.

Signed at London this tenth day of March, 1914.

EDWARD ALFRED GRAHAM.

Witnesses:
 EDWARD E. BARNARD,
 HENRY WM. DIPROSE.

Copies of this patent may be obtained for five cents each, by addressing the "Commissioner of Patents, Washington, D. C."